United States Patent
Owejan et al.

(10) Patent No.: US 8,389,047 B2
(45) Date of Patent: Mar. 5, 2013

(54) LOW-COST HYDROPHILIC TREATMENT METHOD FOR ASSEMBLED PEMFC STACKS

(75) Inventors: Jon P. Owejan, Honeoye Falls, NY (US); Thomas A. Trabold, Pittsford, NY (US); Thomas W. Tighe, Bloomfield, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2021 days.

(21) Appl. No.: 11/643,403

(22) Filed: Dec. 21, 2006

(65) Prior Publication Data

US 2008/0152790 A1    Jun. 26, 2008

(51) Int. Cl.
*B05D 7/00* (2006.01)
*B05C 11/00* (2006.01)
*B05C 13/00* (2006.01)
*B05C 13/02* (2006.01)

(52) U.S. Cl. .......................................... 427/115; 118/62
(58) Field of Classification Search .................. 427/115; 29/623.1–623.5; 429/34, 39
See application file for complete search history.

(56) References Cited

U.S. PATENT DOCUMENTS

| | | | |
|---|---|---|---|
| 4,175,165 A | | 11/1979 | Adlhart |
| 6,627,257 B1 * | | 9/2003 | Foerster et al. ............... 427/235 |
| 6,733,911 B2 | | 5/2004 | Kawahara |
| 2001/0021470 A1 * | | 9/2001 | May et al. ........................ 429/44 |
| 2003/0235735 A1 * | | 12/2003 | Miyazawa et al. .............. 429/26 |
| 2004/0143033 A1 * | | 7/2004 | Schwarte et al. ............. 523/171 |
| 2005/0008919 A1 | | 1/2005 | Extrand |
| 2006/0194095 A1 | | 8/2006 | Vyas |
| 2006/0216571 A1 | | 9/2006 | Vyas |

FOREIGN PATENT DOCUMENTS

JP   2000-223131   * 11/2000

OTHER PUBLICATIONS

D. Stoye and W. Freitag (editors), "Paints, Coatings and Solvents", second, completely revised edition, Wiley-VCH, Weinheim, New York, 1998.*

* cited by examiner

*Primary Examiner* — James Lin
*Assistant Examiner* — Austin Murata
(74) *Attorney, Agent, or Firm* — John A. Miller; Miller IP Group, PLC

(57) ABSTRACT

A method for depositing a hydrophilic coating on flow field plates or bipolar plates and manifolds in a fuel cell stack after the stack is assembled. The method includes preparing a solution that contains hydrophilic nano-particles suspended in a suitable solvent. The cathode and anode inlet and outlet manifolds and the cathode and anode flow channels are filled with the solution. The solution is then pumped out of the stack using, for example, a stream of nitrogen. The stack is allowed to dry, using heat if desirable, to provide a film of the nano-particles formed on the anode and cathode flow channels and manifolds within the stack.

17 Claims, 1 Drawing Sheet

LOW-COST HYDROPHILIC TREATMENT METHOD FOR ASSEMBLED PEMFC STACKS

BACKGROUND OF THE INVENTION

1. Field of the Invention

This invention relates generally to a method for depositing a hydrophilic coating on the bipolar plates of a fuel cell and, more particularly, to a method for depositing a hydrophilic coating on the bipolar plates of the fuel cells in a fuel cell stack that includes running a solution including the hydrophilic material through the reactant gas flow channels in the bipolar plates after the stack is assembled.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The bipolar plates are typically made of a conductive material, such as stainless steel, titanium, aluminum, polymeric carbon composites, etc., so that they conduct the electricity generated by the fuel cells from one cell to the next cell and out of the stack. Metal bipolar plates typically produce a natural oxide on their outer surface that makes them resistant to corrosion. However, the oxide layer is not conductive, and thus increases the internal resistance of the fuel cell, reducing its electrical performance. Also, the oxide layer makes the plate more hydrophobic. It is known in the art to deposit a thin layer of a conductive material, such as gold, on the bipolar plates to reduce the contact resistance between the plate and diffusion media in the fuel cells.

As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below $0.2\ A/cm^2$, the water may accumulate within the flow channels because the flow rate of the reactant gas is too low to force the water out of the channels. As the water accumulates, it forms droplets that continue to expand because of the relatively hydrophobic nature of the plate material. The droplets form in the flow channels substantially perpendicular to the flow of the reactant gas. As the size of the droplets increases, the flow channel is closed off, and the reactant gas is diverted to other flow channels because the channels are in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

It is usually possible to purge the accumulated water in the flow channels by periodically forcing the reactant gas through the flow channels at a higher flow rate. However, on the cathode side, this increases the parasitic power applied to the air compressor, thereby reducing overall system efficiency. Moreover, there are many reasons not to use the hydrogen fuel as a purge gas, including reduced economy, reduced system efficiency and increased system complexity for treating elevated concentrations of hydrogen in the exhaust gas stream.

Reducing accumulated water in the channels can also be accomplished by reducing inlet humidification. However, it is desirable to provide some relative humidity in the anode and cathode reactant gases so that the membrane in the fuel cells remains hydrated. A dry inlet gas has a drying effect on the membrane that could increase the cell's ionic resistance, and limit the membrane's long-term durability.

It has been proposed in the art to deposit a hydrophilic layer on the bipolar plates to improve channel water transport. The hydrophilic layer causes water in the channels to form a thin film that has less of a tendency to alter the flow distribution along the array of channels connected to the common inlet and outlet headers. If the hydrophilic material is sufficiently wettable, water transport through the diffusion media will contact the channel walls and then, by capillary force, be transported into the bottom corners of the channel along its length. The physical requirements to support spontaneous wetting in the corners of a flow channel are described by the Concus-Finn condition, $$\beta + \frac{\alpha}{2} < 90°,$$

where β is the static contact angle and α is the channel corner angle. For a rectangular channel α/2=45°, which dictates that spontaneous wetting will occur when the static contact angle is less than 45°. For the roughly rectangular channels used in current fuel cell stack designs with composite bipolar plates, this sets an approximate upper limit on the contact angle needed to realize the beneficial effects of hydrophilic plate surfaces on channel water transport and low load stability.

Another potential water-related problem in fuel cell stacks is electrode carbon corrosion as a result of anode hydrogen starvation. Further, it has been demonstrated that excessive channel water can lead to freeze damage, as well as increasing freeze start-up time.

Removing liquid water from the flow channels through the manifold to the outside of the stack enclosure requires wetting surfaces not only in the channels of the bipolar plates, but also in the transition between the end of a channel, around the gaskets and into the manifold. The most effective system will have a hydrophilic coating throughout the entire gas volume of the stack. This will effectively reduce the resistance of water removal associated with the changes in surface energy.

Known hydrophilic bipolar plate treatments are typically very expensive relative to the projected plate cost targets. Adding a hydrophilic layer to the bipolar plates requires both process and material optimization for cost reduction. Further, the hydrophilic coatings have been shown to degrade after many hours of run-time, which may impact the fuel cell stability at mid-life of the fuel cell stack. Thus, a low cost repair for this failure mechanism may be essential for long fuel cell stack life.

SUMMARY OF THE INVENTION

In accordance with the teachings of the present invention, a method for depositing a hydrophilic coating on flow field plates or bipolar plates in a fuel cell stack after the stack is assembled is disclosed. The method includes preparing a solution that contains hydrophilic nano-particles suspended in a suitable solvent. The cathode and anode inlet and outlet manifolds and the cathode and anode flow channels are filled with the solution. The solution is then forced out of the stack using, for example, a stream of nitrogen. The stack is allowed to dry, using heat if desirable, to provide a film of the nano-particles formed on the anode and cathode flow channels and manifolds within the stack.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a process for depositing a hydrophilic coating on the flow channels of the bipolar plates in a fuel cell stack after the stack is assembled is merely exemplary in nature, and is in no way intended to limit the invention or its applications or uses.

Figure 1:
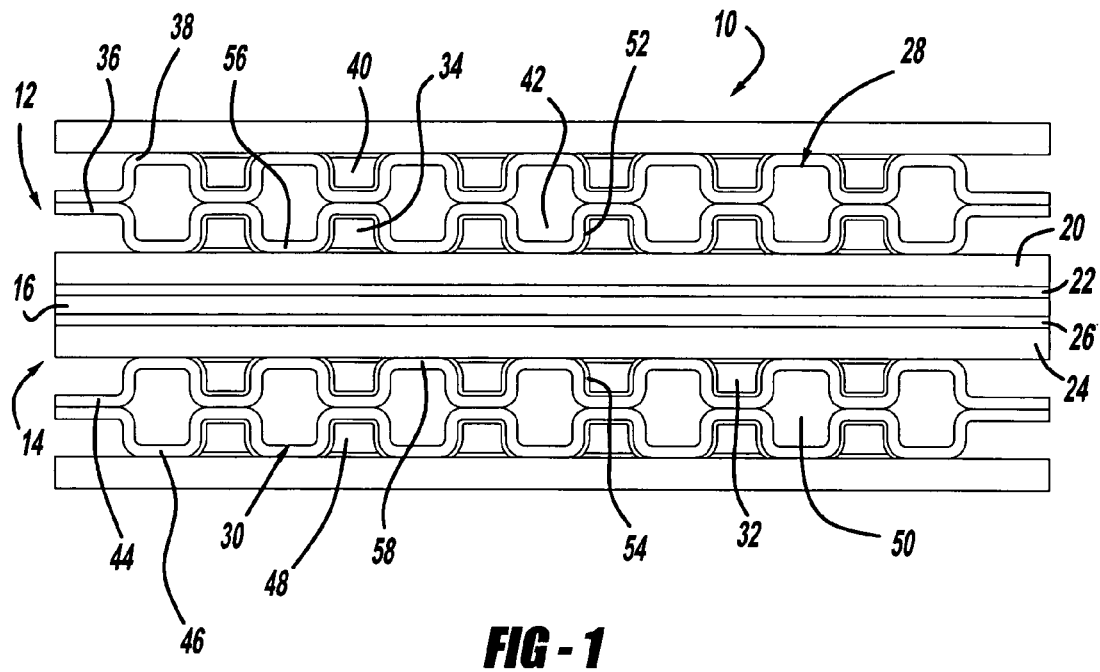
FIG. 1 is a cross-sectional view of a fuel cell in a fuel cell stack that includes bipolar plates having a hydrophilic coating.

FIG. 1 is a cross-sectional view of a fuel cell 10 that is part of a fuel cell stack of the type discussed above. The fuel cell 10 includes a cathode side 12 and an anode side 14 separated by a perfluorosulfonic acid membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode side catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. Various techniques are known in the art for depositing the catalyst layers 22 and 26 on the diffusion media layers 20 and 24, respectively, or on the membrane 16.

A cathode side flow field plate or bipolar plate 28 is provided on the cathode side 12 and an anode side flow field plate or bipolar plate 30 is provided on the anode side 14. The bipolar plates 28 and 30 are provided between the fuel cells in the fuel cell stack. A hydrogen reactant gas flow from flow channels 32 in the bipolar plate 30 reacts with the catalyst layer 26 to dissociate the hydrogen ions and the electrons. Airflow from flow channels 34 in the bipolar plate 28 reacts with the catalyst layer 22. The hydrogen ions are able to propagate through the membrane 16 where they carry the ionic current through the membrane 16. The end product is water, which does not have any negative impact on the environment.

In this non-limiting embodiment, the bipolar plate 28 includes two stamped sheets 36 and 38 that are welded together. The sheet 36 defines the flow channels 34 and the sheet 38 defines flow channels 40 for the anode side of an adjacent fuel cell to the fuel cell 10. Cooling fluid flow channels 42 are provided between the sheets 36 and 38, as shown. Likewise, the bipolar plate 30 includes a sheet 44 defining the flow channels 32, and a sheet 46 defining flow channels 48 for the cathode side of an adjacent fuel cell. Cooling fluid flow channels 50 are provided between the sheets 44 and 46, as shown. The bipolar plates 28 and 30 can be made of any suitable conductive material that can be stamped, such as stainless steel, titanium, aluminum, etc.

The bipolar plate 28 includes a coating 52 and the bipolar plate 30 includes a coating 54 that makes the plates conductive, corrosion resistant, hydrophilic and/or stable in a fuel cell environment. As will be discussed in more detail below, the present invention proposes a process for depositing the coatings 52 and 54 on the bipolar plates 28 and 30 after the fuel cell stack has been assembled. Thus, the lands 56 and 58 between the flow channels 34 and 32, respectively, are not coated with the hydrophilic material, and thus the electrical properties of the plates 28 and 30 for conducting electricity through the fuel cell 10 is not affected. However, the part of the diffusion media layers 20 and 24 facing the flow channels 34 and 32 is coated with the hydrophilic material. It is possible that the hydrophilic solution can be optimized for poor adhesion to the diffusion media relative to the channels.

The process of the invention has particular application for depositing a coating of silicon dioxide ($SiO_2$) nano-particles on the bipolar plates 28 and 30. However, other metal oxides can be used for the hydrophilic coatings including, but not limited to, hafnium dioxide ($HfO_2$), zirconium dioxide ($ZrO_2$), aluminum oxide ($Al_2O_3$), tin oxide ($SnO_2$), tantalum pent-oxide ($Ta_2O_5$), niobium pent-oxide ($Nb_2O_5$), molybdenum dioxide ($MoO_2$), iridium dioxide ($IrO_2$), ruthenium dioxide ($RuO_2$) and mixtures thereof.

The metal oxides can be doped to make them electrically conductive. Suitable dopants can be selected from materials that can create suitable point defects, such as N, C, Li, Ba, Pb, Mo, Ag, Au, Ru, Re, Nd, Y, Mn, V, Cr, Sb, Ni, W, Zr, Hf, etc. and mixtures thereof. In one particular embodiment, the doped metal oxide is niobium (Nb) and tantalum (Ta) doped titanium oxide ($TiO_2$) and fluorine (F) doped tin oxide ($SnO_2$). The amount of dopant in the coatings can be in the range of 0-10% of the composition of the coatings.

In another embodiment, the hydrophilic coatings 52 and 54 are carbides that are conductive, corrosion resistant, hydrophilic and stable in the fuel cell environment. Suitable carbides may include, but are not limited to, chromium carbide, titanium carbide, tantalum carbide, niobium carbide and zirconium carbide.

Figure 2:
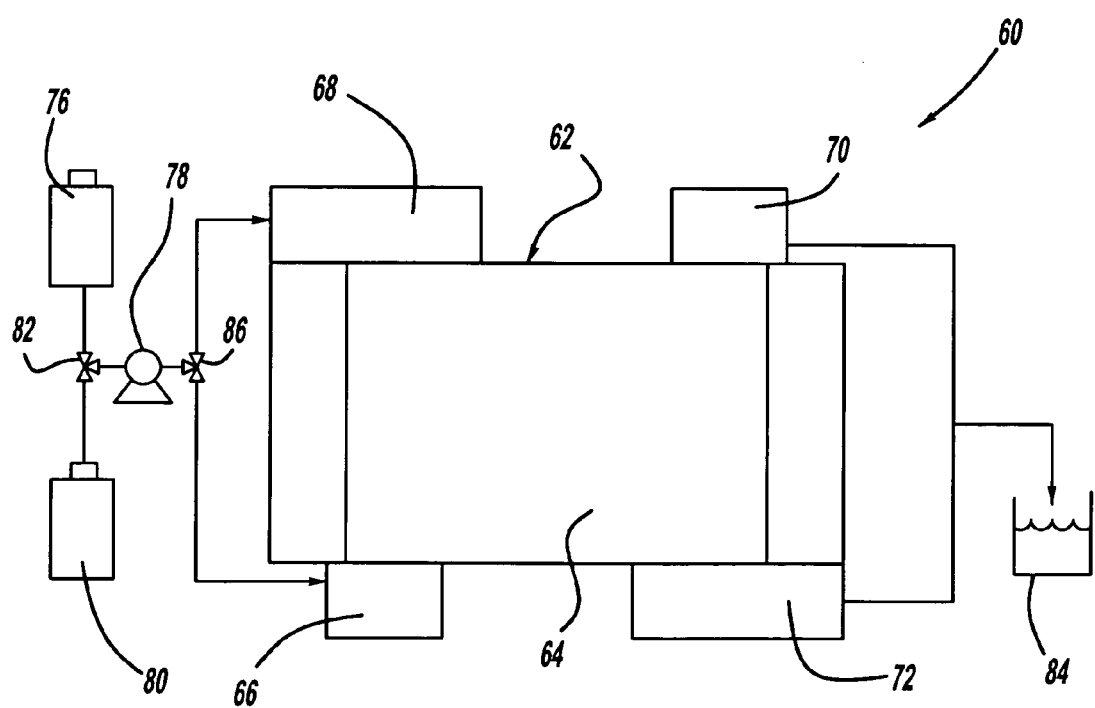
FIG. 2 is a plan view of a system for depositing a hydrophilic coating on anode and cathode flow channels in a fuel cell stack, according to an embodiment of the present invention.

FIG. 2 is a plan view of a system 60 for depositing the hydrophilic coatings 52 and 54 on the bipolar plates 28 and 30. The system 60 includes a fuel cell stack 62 shown in cross-section. The fuel cell stack 62 includes an active region 64, an anode inlet manifold 66, a cathode inlet manifold 68, an anode outlet manifold 70 and a cathode outlet manifold 72. The anode and cathode flow channels shown in FIG. 1 would extend from the inlet manifolds 66 and 68 through the active region 64 to the outlet manifolds 70 and 72.

According to the invention, the entire anode and cathode volume of the fuel cell stack 62, including the flow channels and the inlet and outlet manifolds, is filled with a solution including suspended hydrophilic nano-particles. In one non-limiting embodiment, the solution is $SiO_2$ nano-particles suspended in a solvent, such as ethanol. A solution of $SiO_2$ nano-particles suspended in ethanol is available as a commercial product, referred to as nano-X, from nano-XGmbH of Saarbrucken, Germany. A source 76 of the solution can be pumped by a pump 78 into the anode and cathode inlet manifolds 66 and 68. A pressurized inert gas, such as nitrogen, from a source 80 is then allowed to flow into the anode and cathode inlet manifolds 66 and 68 through a three-way valve 86 that forces the solution out of the stack 62 through the outlet manifolds 70 and 72. A three-way valve 82 can be switched between the source 76 and the source 80. Nitrogen may continue to flow after all the hydrophilic solution is removed to aid evaporation and remove solvent vapor from the system. A thin film of the solution is left on the flow channels, stack manifolds and inlet header plumbing. The stack 62 is allowed to dry so that the solvent in the wet film evaporates, leaving a thin film of the hydrophilic nano-particles. Any suitable technique can be used to dry the solvent, such as by heating the stack or flowing a dry inert gas through the stack 12. In one embodiment, the film has a thickness on the order of 100 nm. The solution from the stack 62 can be collected in a container 84 to be used for another fuel cell stack.

Because hydrophilic coatings have a high surface energy, they will attract particles and other contaminants entering the fuel cell from the gaseous fuel and/or oxygen streams, from humidifiers and upstream piping, or generated internally by other components, such as the MEA, diffusion media, seals, etc. Accumulation of these contaminants on the hydrophilic coatings will, over time, significantly reduce the hydrophilicity of the coating. Thus, the hydrophilic coatings will degrade after many hours of run time, which may impact the fuel cell stability. Therefore, the present invention also proposes using the process of depositing the hydrophilic coatings on the flow channels as a service of the vehicle. Particularly, at some point in the life of a fuel cell vehicle, it may have stability problems. The fuel cell stack in the vehicle can be connected to a suitable fixture at a service center that fills the stack with the hydrophilic solution, as discussed above, and then pumps the solution out of the stack using the inert gas to recoat the flow channels with the hydrophilic material.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for depositing a hydrophilic material on flow channels defined by bipolar plates in an assembled a fuel cell stack, said method comprising:
   providing a solution of hydrophilic particles in a solvent;
   filling the anode and cathode flow volume in the stack with the solution;
   forcing the solution out of the stack using a flow of gas; and
   allowing the remaining wet solution in the stack to dry to allow the solvent to evaporate and the hydrophilic particles to adhere to the flow channel walls.

2. The method according to claim 1 wherein the hydrophilic particles are nano-particles.

3. The method according to claim 1 wherein the hydrophilic particles are metal oxide particles.

4. The method according to claim 1 wherein the hydrophilic particles are silicon dioxide nano-particles suspended in an alcohol solution.

5. The method according to claim 1 wherein filling the anode and cathode flow volume in the stack with the solution includes filling the anode and cathode inlet manifolds, the anode and cathode flow channels and the anode and cathode outlet manifolds with the solution.

6. The method according to claim 1 wherein forcing the solution out of the stack includes forcing nitrogen into the anode and cathode flow volume of the stack.

7. The method according to claim 1 wherein allowing the remaining wet solution in the stack to dry includes heating the stack.

8. The method according to claim 1 wherein allowing the remaining wet solution in the stack to dry includes flowing a dry inert gas into the stack.

9. The method according to claim 1 wherein the method is performed when the stack is assembled and new.

10. The method according to claim 1 wherein the method is performed after the stack has been in service as a maintenance procedure.

11. A method for depositing a hydrophilic material on flow channels defined by bipolar plates in a fuel cell stack after the stack is assembled, said method comprising:
    providing a solution of hydrophilic nano-particles suspended in an alcohol solvent;
    filling anode and cathode inlet manifolds, anode and cathode flow channels and anode and cathode outlet manifolds with the solution;
    forcing the solution out of the stack using a stream of an inert gas; and
    allowing the remaining wet solution in the stack to dry to allow the solvent to evaporate and the hydrophilic nano-particles to adhere to the flow channel walls.

12. The method according to claim 11 wherein the hydrophilic nano-particles are metal oxide particles.

13. The method according to claim 11 wherein the hydrophilic nano-particles are silicon dioxide nano-particles.

14. The method according to claim 11 wherein forcing the solution out of the stack includes forcing nitrogen into the anode and cathode flow volume of the stack.

15. The method according to claim 11 wherein allowing the remaining wet solution in the stack to dry includes heating the stack.

16. The method according to claim 11 wherein allowing the remaining wet solution in the stack to dry includes flowing a dry inert gas into the stack to evaporate the solution.

17. The method according to claim 11 wherein the method is performed after the stack has been in service as a maintenance procedure.

* * * * *